United States Patent [19]

Ueda

[11] 4,032,969
[45] June 28, 1977

[54] SYSTEM FOR REPRODUCING AND RECORDING A PLURALITY OF COLOR ORIGINALS

[76] Inventor: Sadao Ueda, 193 Hatakeyama-cho, Imadegawa-agaru, Koromodana-dori, Kamigyo, Kyoto, Japan

[22] Filed: June 24, 1976

[21] Appl. No.: 699,308

Related U.S. Application Data

[63] Continuation-in-part of Ser. No. 527,594, Nov. 27, 1974, abandoned, which is a continuation of Ser. No. 348,216, April 5, 1973, abandoned.

[52] U.S. Cl. .................................................. 358/80
[51] Int. Cl.² ............................................ G03F 3/08
[58] Field of Search ......... 358/75, 80; 178/6.6 DD, 178/6

[56] References Cited

UNITED STATES PATENTS 3,878,559  4/1975  Pugsley .................................. 358/75

Primary Examiner—Howard W. Britton
Assistant Examiner—Mitchell Saffian
Attorney, Agent, or Firm—Lackenbach, Lilling & Siegel

[57] ABSTRACT

A system for reproducing and recording a plurality of color originals is disclosed which simultaneously scans a series of sections of a scanning field in which there are disposed pictures having different characteristics and changing the set values of color separation and correction circuitry to compensate for these conditions or characteristics. The scanning process is synchronized with the selection of the suitable conditions of color separation and correction to correspond to the type of picture which is being scanned at any given or particular time.

6 Claims, 10 Drawing Figures

SYSTEM FOR REPRODUCING AND RECORDING A PLURALITY OF COLOR ORIGINALS

CROSS REFERENCES TO RELATED APPLICATIONS

This application is a Continuation-In-Part Application of application Ser. No. 527,594, filed on Nov. 27, 1974 for "SYSTEM FOR REPRODUCING AND RECORDING A COLOR ORIGINAL", now abandoned, which in turn was a continuation application of application Ser. No. 348,216, filed on Apr. 5, 1973, for "SYSTEM FOR REPRODUCING AND RECORDING A COLOR ORIGINAL", now abandoned.

BACKGROUND OF THE INVENTION

This invention generally relates to a device for reproducing and recording an original picture by electromechanical and optical scanning.

There are conventional picture scanning and recording devices such as electronic color separation machines for plate making and color facsimile equipment, in which original pictures are scanned under fixed conditions set for plural characteristics during one scanning operation.

Referring to FIG. 1, for example, there is shown in perspective, a plurality of original pictures mounted on a cylinder 1. A plurality of original pictures 2, 3, 4 and 5 are mounted as a group on cylinder 1 as shown in FIG. 1 and all may be reproduced and recorded under the same conditions. However, the separate pictures cannot be recorded with separate instructions according to such individual pictures. In the hitherto known devices, therefore, it has been necessary, in the grouping of a plurality of originals, to select and combine those which are most similar to each other in color tone, density, etc. so as to be scanned under the same or similar conditions. Such originals are similar in color characteristics and may be corrected if there is a large number of pictures available for selection. However, such grouping is difficult if there are a few original pictures available or if the pictures which are available have greatly differing characteristics. In such cases, the scanning of a picture from point to point is necessarily performed in a very inefficient manner.

SUMMARY OF THE INVENTION

In accordance with the present invention, there is provided a device which does not possess the above-described disadvantages, and which has means for automatically changing conditions set for proper reproduction of a plurality of originals while simultaneously scanning these pictures. With the present invention, the pictures which are mounted as a group can have substantially different color characteristics without impairing the results.

DESCRIPTION OF THE PREFERRED EMBODIMENTS

Figure 1:
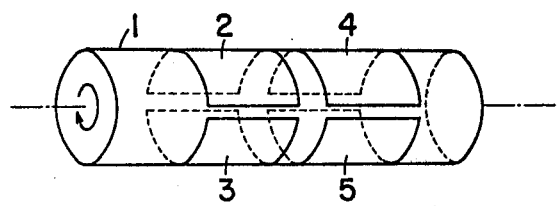
FIG. 1 is a perspective view of a cylinder typically used to mount a plurality of original pictures for simultaneously scanning the same during reproduction and recording of the original pictures by electromechanical and optical scanning means.
Figure 2:
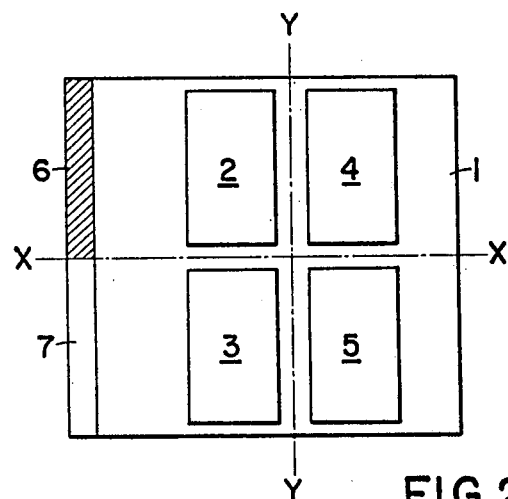
FIG. 2 is a development of the cylinder shown in FIG. 1, showing the principle of the present invention and the sections in axial and circumferential directions.
Figure 3:
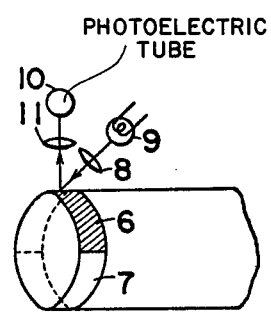
FIG. 3 is a perspective view showing one example of a pulse generator.

The principle of this invention, as shown in the development of the cylinder in FIG. 2, is such that the set values for a circuit to control conditions of reproduction may be changed over in response to signals from a pulse generator, which is provided so as to indicate sections in axial and circumferential directions, assuming lines X—X, Y—Y to be present to divide individual original pictures in said directions.

A pulse generator or switching means may be formed, for example, by using part of the cylinder 1, which includes black and white surfaces 6 and 7 on the periphery, and illuminating the surfaces 6 and 7 through a condenser 8 by a light source 9 in such a manner that reflected light may be received by a photoelectric tube 10 through a condenser 11. Alternately, change-over operation for axial sections may be realized by using a microswitch provided for detecting the motion of a scanning head and change-over of the set values for the circuit taking place at the time that the axial sections reach their proper positions.

Figure 4:
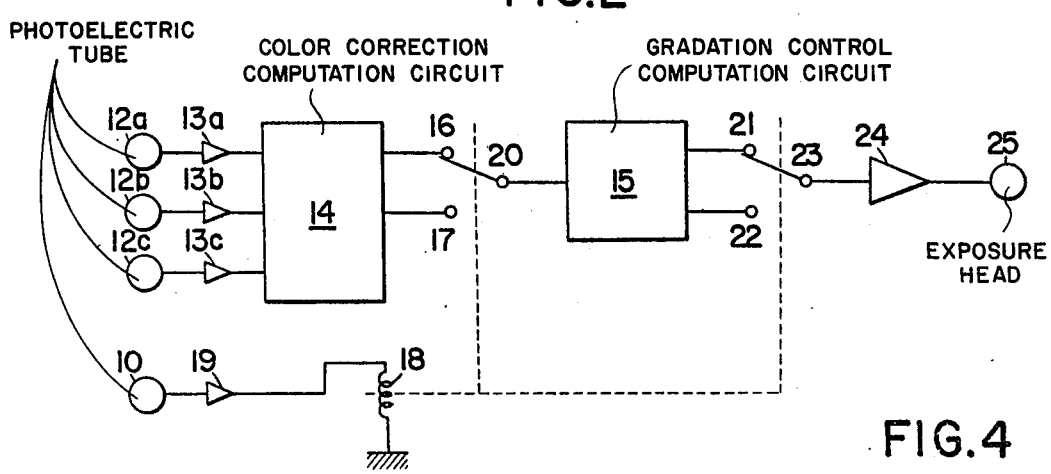
FIG. 4 is a block diagram of one embodiment of means for changing the set values.

FIG. 4 is a block diagram of an electronic color separator for plate-making embodying this invention. Light from a light spot scanning a color original picture is separated into three portions through a half mirror or the like, which portions are then passed or transmitted through red, blue, and green filters unto photoelectric tubes 12a, 12b and 12c. The three photoelectric tubes generate color separation signal currents in response to the color tone and gradation of the color original. Such currents are amplified by amplifiers 13a, 13b and 13c and fed to a color correction computation circuit 14 and then to a gradation control computation circuit 15.

The computation circuits 14 and 15 are of plural construction each for setting conditions for reproduction separately, which settings are different for a plurality of different color originals. Each of the circuits 14 and 15 may be conventional correction and gradation circuits and each may comprise a plurality of conventional circuits connected in parallel to each other, as will be more fully described in connection with FIGS. 4A and 4B.

For example, the correction circuit 14 can be formed by connecting three inputs of two correction circuits of the type disclosed in U.S. Pat. No. 2,981,792, in parallel to each other and correcting the single outputs of the parallel circuits to the fixed contacts or terminals 16, 17 of a first switch as shown in FIG. 4. Thus, the color correction computation circuit 14 provides two signal currents after computation for color correction as outputs at terminals 16 and 17 respectively.

In this manner, color corrected signals corresponding to separate set conditions for two kinds of color originals can be obtained by operating a relay 18 through an amplifier 19 with signals from the photoelectric tube 10 in the section pulse generator so as to change over from the terminal 16 to the terminal 17 and vice versa by means of a movable terminal 20 of the first switch.

Similarly, by connecting the single inputs of two known gradation circuits in parallel and to the terminal 20 of the first switch, the gradation control computation circuit 15 alternately provides two signals, at the terminals 21 and 22 of a second switch, after computation as an output at terminal 23 of the second switch. The output is amplified by the amplifier 24 and fed to an exposure head 25.

Thus, it is possible to reproduce and record two color original pictures having different color characteristics under their respective suitable conditions of reproduction by scanning them at the same time.

Figure 4A:
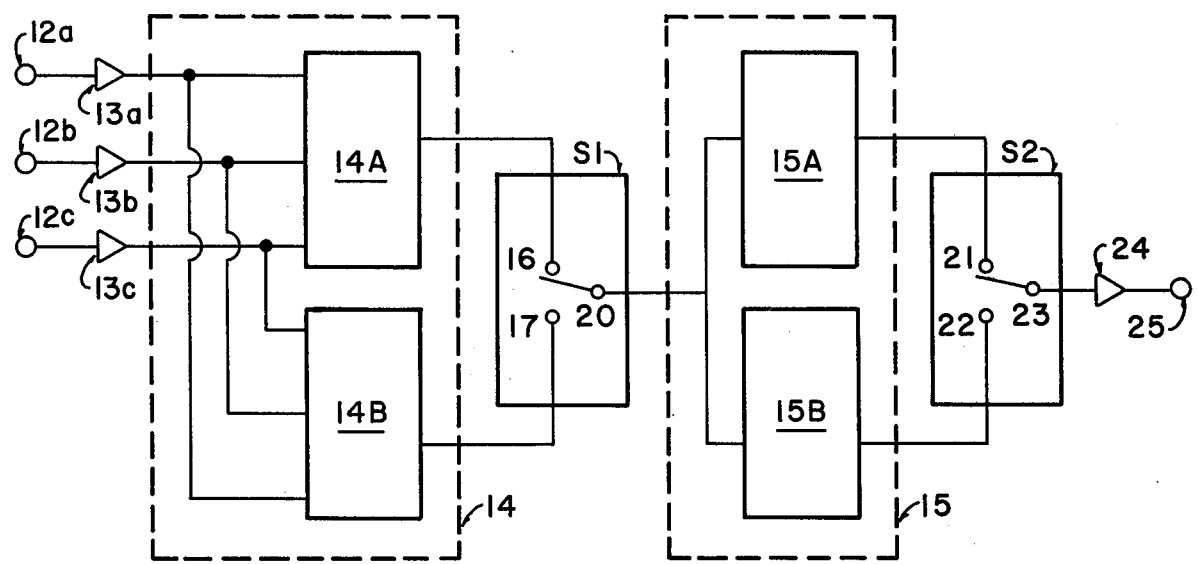
FIG. 4A is a block diagram showing one possible arrangement of known correction and gradation computation circuits to produce the block diagram shown in FIG. 4.

As suggested above, the blocks designated by the reference numerals 14 and 15 in FIG. 4 are intended to contain a plurality of known constructions for accomplishing the function described. The purpose for utilizing a plurality of known correction and gradation computation circuits is to provide the necessary number of inputs and outputs so that appropriate switching can take place in synchronism with the scanning operations. Referring to FIGS. 4A there is shown one possible arrangement of the individual blocks 14 and 15 shown in FIG. 4. The dashed outline designated by the reference numeral 14 represents two known correction circuits 14A and 14B, each of which has three inputs as disclosed, for example, in U.S. Pat. No. 2,981,792. The three inputs of each of the circuits 14A and 14B are connected in parallel to each other as shown so that there is but one set of three inputs to both of these circuits and, therefore, to the parallel combination of the circuits. On the other hand, the individual or single outputs of each of the circuits 14A and 14B are each connected to the switch S1 and, particularly, to the terminals 16 and 17 thereof respectively. The movable terminal 20 of the switch S1 is movable between the contacts or terminals 16 and 17 simultaneously with or in synchronism with the scanning operation as described herein. In this way, a single set of three inputs could be applied to each of the individual correction circuits 14A and 14B while the outputs of each of these, which have been preset for certain characteristics of photographs, can be conveniently selected continuously and simultaneously during scanning operation of the photographs or pictures.

Similarly, still referring to FIG. 4A, the gradation circuit 15 is composed of two individual known gradation circuits 15A and 15B, each of which has a single input and a single output. However, the inputs of the gradation circuits 15A and 15B are connected in parallel to each other and to the movable terminal 20 of the first switch S1 as shown. The output terminals of the circuits 15A and 15B are connected to the fixed contacts or terminals 21 and 22 as shown, with the movable terminal 23 of the switch S2 providing the signal for the exposure head 25.

An important feature of the present invention, therefore, is that a plurality of known circuits be placed in parallel as suggested, so that each can be separately set for specific or desired conditions of reproduction. Well-known correction and gradation circuits may be utilized in the formation of the circuit show in FIG. 4, these known circuits being connected to each other in parallel and connected to switch terminals so that they can be conveniently switched simultaneously with the scanning operation of the pictures as suggested above. Each individual circuit within each block 14, 15 is preset to correspond with the characteristics of pictures which are simultaneously scanned when the circuit element is placed into an operative condition during switching.

By way of example only, a number of U.S. patents may be made reference to which disclose exemplary color correction computation circuits and gradation control computation circuits of the general type which may be used in conjunction with the present invention. These are U.S. Pat. No. 2,605,348 entitled "Color Separation Negative" by Hall et al., U.S. Pat. No. 2,721,892 entitled "Variable Electro-Optical Color Correction" by Yule, U.S. Pat. No. 2,981,792 entitled "Color Correction Computer for Engraving Machines" by Farber, and U.S. Pat. No. 3,218,387 entitled "Apparatus for Correction of Half-Tone Color Images" by Farber. These patents represent well-known prior art which may be used with the present invention. Additional prior art which is of interest in conjunction with the present invention is as follows: U.S. Pat. No. 2,799,722 entitled "Reproduction with Localized Correction" by Neugebauer; U.S. Pat. No. 2,894,058 entitled "Registration System" by Shapiro; U.S. Pat. No. 3,005,042 entitled entitled "Electronic Motion Picture Printer" by Horsley; U.S. Pat. No. 3,588,322 entitled "Knockout Masking Techniques" by Bartel; U.S. Pat. No. 3,529,078 entitled "Optical Scanning System for Transfer of Selected Color Patterns" by Murata; and German Pat. No. 1,172,540 entitled "Method For Electronic Copying Into One Another Of Parts Of Original Copies Of Images" by Hell.

Figure 4B:
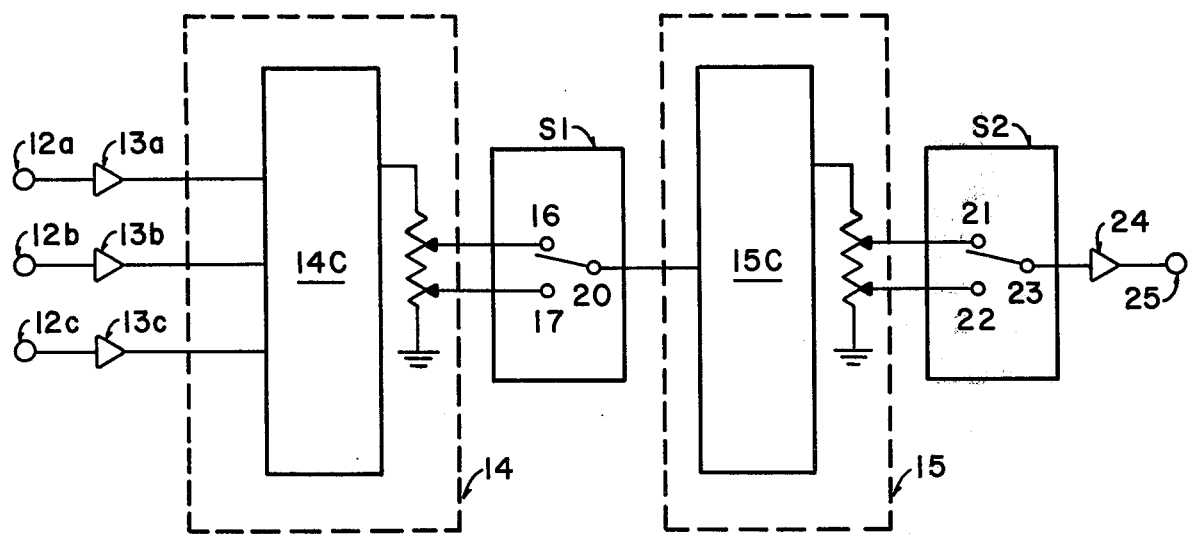
FIG. 4B is a block diagram of another arrangement of known correction and gradation computation circuits to form the embodiment shown in FIG. 4.

Referring to FIG. 4B, there is shown, by way of example only, a further possible arrangement of known correction and gradation circuits which provide the requisite number of outputs and inputs required for switching purposes in accordance with the present invention. Here, the correction circuit 14C has three inputs as are disclosed, for example, in U.S. Pat. No. 2,981,792, with the single outputs being grounded through a resistor-potentiometer having two sliding terminals. Each sliding terminal of the potentiometer forms one of the terminals 16, 17 of the switch S1 shown in FIG. 4. Similarly, the gradation circuit 15C has its one input connected to the terminal 20 while the output terminal thereof is similarly grounded through a resistor-potentiometer having two sliding terminals respectively connected to the terminals 21 and 22 of the second switch S2. Clearly, when the sliding terminals 20 and 22 of the respective switches S1, S2 are displaced from each other along the potentiometers, they provide different signals or information and such can be pre-selected to pre-set the recording characteristics to correspond with the characteristics of the pictures being scanned. While the arrangement shown in FIG. 4A is the presently preferred one, either circuit arrangement may be utilized in conjunction with the present invention, with varying degrees of advantage.

The specific circuit arrangements of the circuits 14 and 15 in FIG. 4 are not critical for the purposes of the present invention and numerous circuit configurations or arrangements of known elements or circuits can be used to achieve the desired results. It is only important for the purposes of the present invention that the circuits 14 and 15 have the requisite number of inputs and outputs so that different conditions of reproduction and recording characteristics can be selectively switched to correspond with the characteristics of the photograhs which are being scanned. In this manner, by having the suitable signals at each of the switch terminals, and by pre-setting the individual circuits, for example, circuits 14A-14C and 15A-15C, uniformly satisfactory printing of photographs having different characteristics may be effected by actuating the synchronous switches simultaneously with the operation of the picture scanning device.

As suggested above, an important feature of the present invention is the manner of "synchronizing" the scanning process with the selection of suitable conditions of color separation and correction to therefore correspond to the "type" of picture which is being scanned at any given or particular time. In the case of the embodiment shown in FIG. 4, the switching is shown, for purposes of simplicity and clarity, to be performed by a relay. Advantageously, however, the relay is replaced by a semi-conductor switch.

Figure 5:
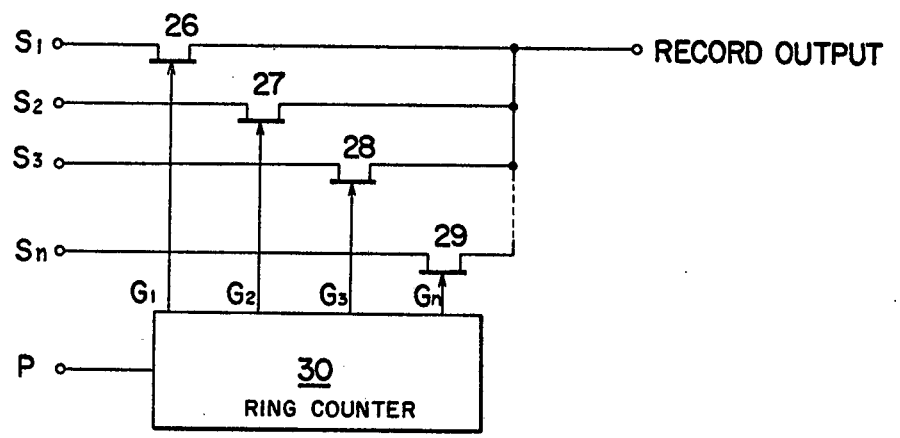
FIG. 5 shows one example of an analog switch which may be used with the present invention.

In FIG. 5, field effect transistors (FET)26, 27, 28 . . . 29 are used as analog switches, where $S_1, S_2, S_3 \ldots S_n$ represent a plurality of outputs from computation circuits, and P a signal from a pulse generator. The reference numeral 30 represents a ring counter which receives section pulse signals from the pulse generator and transmits gate signals $G_1, G_2, G_3, \ldots G_n$ to the FETs 26, 27, 28 . . . 29.

Figure 6:
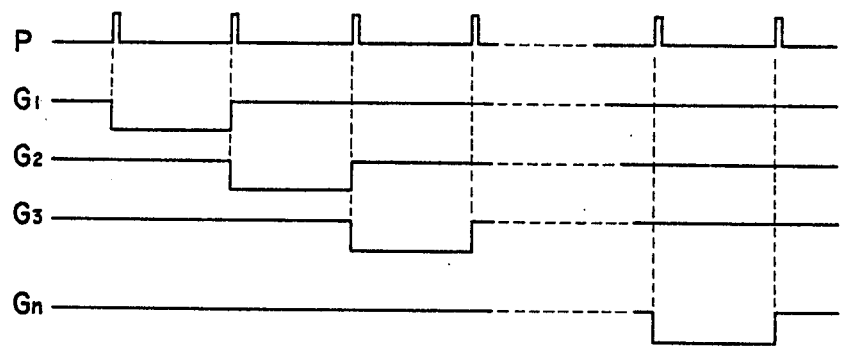
FIG. 6 is a timing diagram, showing the relation of the pulses and the gate signals in the analog switch shown in FIG. 5.

FIG. 6 is a diagram explanatory of the state of gate signals from the ring counter, where the section pulse signal P generates gate signals $G_1, G_2, G_3 \ldots G_n$ as outputs therefrom as shown, which in turn give instructions to individual FETs so as to transmit a plurality of outputs $S_1, S_2, S_3 \ldots S_n$ from computation circuits to recording means in proper succession.

Figure 7:
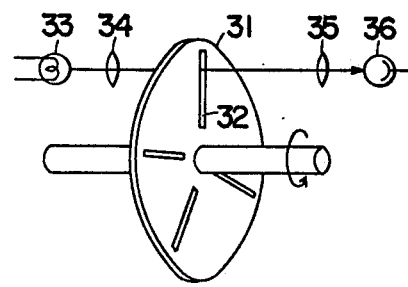
FIG. 7 is a perspective view showing one embodiment of a section pulse generator.

The section pulse P may also be generated by such means as shown in FIG. 7. Here, a rotary disc 31 is provided with some slits 32 which are angularly spaced about an axis at proper intervals. A light source 33, condensers 34 and 35 and a photoelectric tube 36 are provided which are aligned within a range of the motion of such slits 32. Thus, section pulse signals may be generated as desired by rotating the disc 31 in synchronization with the original cylinder.

Figure 8:
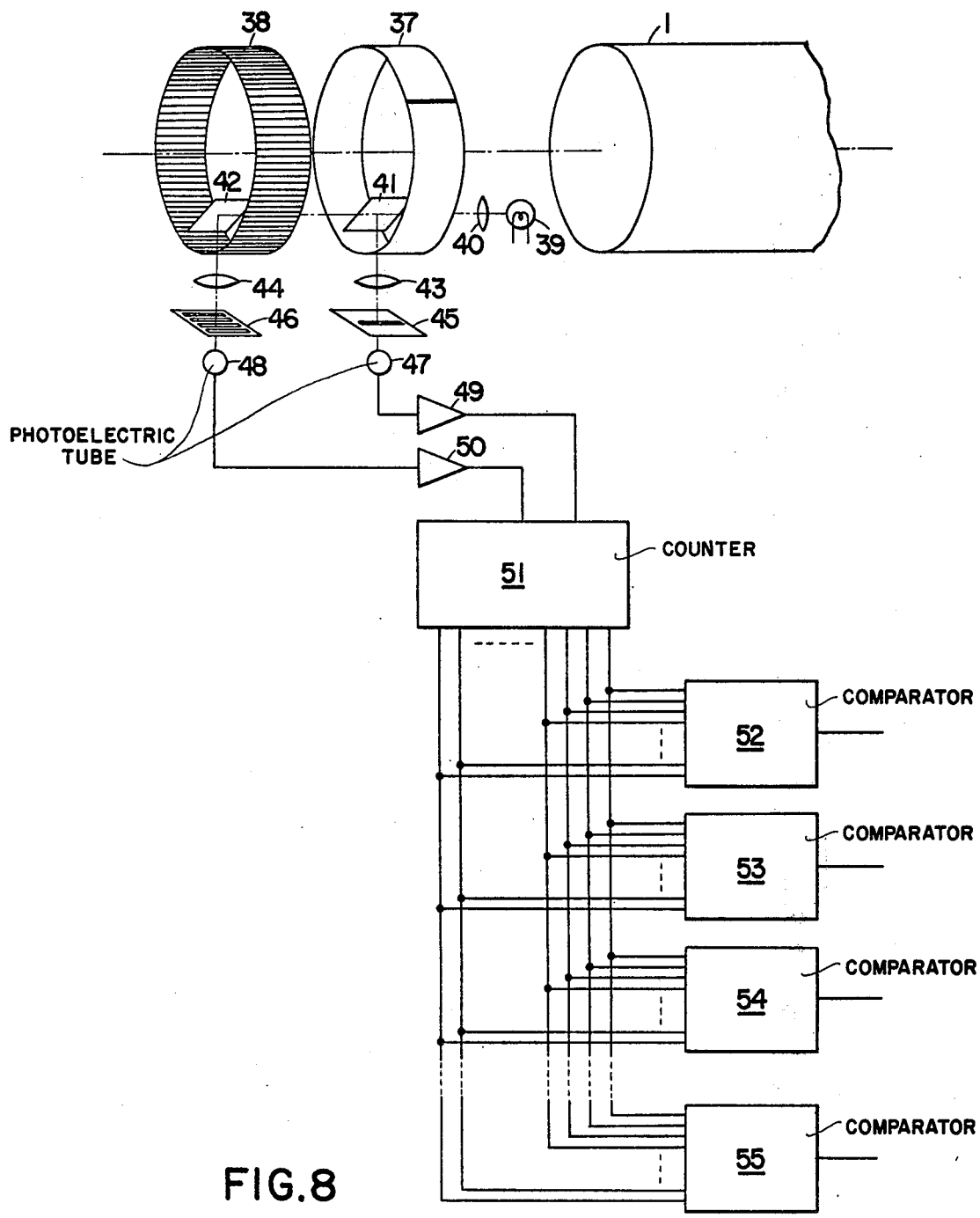
FIG. 8 shows another embodiment of a section pulse generator.

FIG. 8 shows another means for producing the section pulse signal P, in which a one revolution pulse generating ring 37 and a plural pulse generating ring 38 are rotated synchronously with the original cylinder 1. A light source 39, condenser 40, half mirror 41, mirror 42, condensers 43 and 44, slits 45 and 46, and photoelectric tubes 47 and 48 are provided and arranged as shown in the figure, so that a plurality of pulse signals and one revolution pulse signals may be generated.

The two signals at the outputs of the photoelectric tubes 47 and 48 are amplified by amplifiers 49 and 50 respectively and fed to a counter 51, which counts a plurality of pulses per revolution and sends that to the comparators 52, 53, 54 . . . 55. The comparators are arranged to generate section pulse signals for color original pictures so that these may be transmitted when counts in the counter have reached values pre-set therein.

As described above, in accordance with this invention, a plurality of original pictures different in such characteristics as color tone, density, and gradation can be scanned as a group and be reproduced and recorded on the conditions of reproduction adequate for their respective characteristics by simultaneous scanning. Thus, limitations on combinations or groupings of original pictures is eliminated, unlike in the prior art devices. In this manner, the efficiency of the operation is greatly improved. This is very significant from the viewpoint of practical use.

It is to be understood that the foregoing description of the various embodiments illustrated herein are exemplary only and modifications to the embodiments shown herein may be made without departing from the spirit and scope of the invention. For example, it should be clear that this invention may equally apply not only to cylindrical scanning systems as generally described above, but also to planar scanning systems.

What is claimed is:

1. A system for reproducing and recording color original pictures by electromechanical and optical scanning comprising a picture scanning device having a scanning field divided into sections, each section being adapted to support an original picture of a group of pictures with the pictures of the group having different characteristics, each original picture of said group being placed into respective sections of the scanning field of the picture scanning device, circuit means for controlling conditions of reproduction, said conditions of reproduction including set values related to the characteristics of said pictures, said circuit means being responsive to respective ones of said sections of said scanning field for setting said conditions of reproduction, and means for controlling said circuit means for changing said set values in synchronism with scanning of said pictures mounted on said sections of said scanning field.

2. A system as set forth in claim 1, wherein said circuit means comprises a color correction computation circuit having an input and an output, and a gradation control computation circuit having an input and output, photoelectric tube means connected to said input color correction computation circuit and receiving original picture information, said output of said color correction computation circuit being connected through first switch means to said input of said gradation control computation circuit, an exposure head connected to the output of said gradation control computation circuit through second switch means.

3. A system as set forth in claim 2, wherein said means for controlling said circuit means comprises relay means controlling said first and second switch means, said relay means being operated by a second photoelectric tube means directed toward said original picture.

4. A system as set forth in claim 1, wherein said means for controlling said circuit means comprises a plurality of field effect transistors, the same one terminal of each of said transistors connected together receiving an input ring counter, the outputs of stages of said ring counter being supplied as inputs to the gate terminals of respective transistors, and section pulses generated as outputs of respective ones of said transistors.

5. A system as set forth in claim 1, wherein said means for controlling said circuit means comprises a disc having spaced apart slits, section pulses being generated as light passes through said slits.

6. A system as set forth in claim 1, in which the originals are mounted on a rotating cylinder, wherein said means for controlling said circuit means comprises a one pulse generating ring and plural pulse generating rings synchronously rotated with said original cylinder, said pulse generating rings having outputs combined to form section signals.

* * * * *